United States Patent [19]
Fujimori et al.

[11] Patent Number: 5,982,828
[45] Date of Patent: Nov. 9, 1999

[54] SYNCHRONOUS DATA TRANSFER SYSTEM USING TIME STAMP

[75] Inventors: Junichi Fujimori; Yoshihiro Inagaki, both of Hamamatsu, Japan

[73] Assignee: Yamaha Corporation, Hamamatsu, Japan

[21] Appl. No.: 08/857,909

[22] Filed: May 16, 1997

[30] Foreign Application Priority Data

May 20, 1996 [JP] Japan ................................. 8-147808

[51] Int. Cl.$^6$ ....................................................... H04L 7/00
[52] U.S. Cl. ........................ 375/356; 375/362; 370/509; 713/400
[58] Field of Search .................................... 375/354, 356, 375/362; 370/503, 509; 713/400

[56] References Cited

U.S. PATENT DOCUMENTS 5,461,189  10/1995  Higashi et al. .
5,550,873  8/1996   Dolev et al. ............................. 375/354
5,555,261  9/1996   Nakayama et al. ...................... 370/474

*Primary Examiner*—Amanda T. Le
*Attorney, Agent, or Firm*—Graham & James LLP

[57] ABSTRACT

There is provided a data transfer system over a plurality of nodes each having an internal oscillating circuit to generate a clock signal. The plurality of the nodes are connected to one another through a communication network and operate asynchronously with one another according to the respective clock signals. One of the nodes supplies a synchronization signal indicative of a reference time to the communication network. The plurality of the nodes include a transmitting node that transmits a train of data having a time-sequential arrangement together with time data indicative of a time lag relative to the reference time, and a receiving node that receives the train of dada together with the time data by which synchronous communication of the train of data can be ensured between the transmitting node and the receiving node.

22 Claims, 6 Drawing Sheets

SYNCHRONOUS DATA TRANSFER SYSTEM USING TIME STAMP

BACKGROUND OF THE INVENTION

1. Field of the Invention

The present invention relates to a data transfer system for transferring digital audio data or the like that time-sequentially varies at a predetermined period via a communication network. More particularly, the present invention relates to a data transfer system designed such that a receiving node can correctly restore original data maintaining the state of time-sequence without using a separate sync signal line.

2. Description of Related Art

The network-based data transfer systems are generally classified into synchronous data transfer and asynchronous data transfer. Generally, in the synchronous data transfer, a separate sync signal line is provided between a transmitting node and a receiving node, and data is transmitted in synchronization with the sync signal, allowing the receiving node to correctly restore the original data. Therefore, the synchronous data transfer is suitable for transmission of digital audio data or the like that require the correct restoration of a position along a time axis (hereafter, referred to as "time position"). However, the synchronous transmission requires a separate sync signal line in addition to a data line, and a device for controlling synchronization between the transmitting and receiving nodes. In addition, during the synchronous communication, the line is occupied by the transmitting and receiving nodes, thereby lacking general versatility as a communication method.

On the other hand, the asynchronous transmission requires no separate sync signal line, and is therefore suitable for applications in the transmission of character data and still-picture data treated by personal computers, for example. However, a packet transmission used in the asynchronous method loses the information of time position inherent to data, making it unsuitable for the transmission of digital audio data.

To overcome these problems, a pseudo synchronous method has recently come to be used, in which each of the nodes in a network has separately a clock oscillator for generating an internal clock and a clock counter for counting the clock generated by the clock oscillator. A transmitting node attaches time data in the form of a time stamp to a head of a data packet for transmission to the network. On the other hand, the receiving node compares the time data with a time count produced by the internal counter. If an error is found therebetween, the receiving node adjusts the time count by the time data to thereby sequentially restore, based on the adjusted time count, the data transmitted from the transmitting node. Such a pseudo synchronous transmission method is specified in IEEE1394, for example.

However, in the above-mentioned pseudo synchronous transmission, the individual clock oscillators of the nodes involved in the network do not always oscillate exactly at the same frequency, causing an error to some extent. The deviation in oscillation between the transmitting and receiving nodes caused by this error is removed by correcting the time count of the clock counter of the receiving node with reference to the time data provided from the transmitting node at every synchronous timing, or every time the time data is received. This transmission method is practiced on the basis of a rule that inhibits reverse counting of time in the negative direction, and that allows double counting of the same value and forward skip counting in the positive direction for adjustment. Based on the adjustment rule, normally the receiving node can correctly restore the time-sequential arrangement of the original digital audio data or the like according to the time data transmitted from the transmitting node along with the digital audio data.

However, when the time count skips in the positive direction, the data incidentally received at the skipped timing may not be restored. Even worse, if the data received at the skipped timing is a time stamp, the packet data following this time stamp may not be restored correctly. In addition, since the above-mentioned rule allows the time count to skip in the positive direction, the clock generating circuit becomes complex in construction.

SUMMARY OF THE INVENTION

It is therefore an object of the present invention to provide a data transfer system designed to eliminate skip of a time count that is caused by the frequency deviation between internal clock oscillators of transmitting and receiving nodes in a network for correct restoration of original data based on the pseudo synchronization.

In carrying out the invention, there is provided a data transfer system comprising a plurality of nodes each having an internal oscillating circuit to generate a clock signal. The plurality of the nodes are connected to one another through a communication network and operate asynchronously with one another according to the respective clock signals. One of the nodes supplies a synchronization signal indicative of a reference time to the communication network. The plurality of the nodes include a transmitting node that transmits a train of data having a time-sequential arrangement together with time data indicative of a time lag relative to the reference time, and a receiving node that receives the train of dada together with the time data by which synchronous communication of the train of data can be ensured between the transmitting node and the receiving node. The transmitting node internally generates a first clock signal and transmits the train of data time-sequentially arranged according to the first clock signal together with the time data which has a shorter length of bits. The receiving node comprises a counting device that counts a second clock signal internally generated at a frequency at least twice as fast as that of the first clock signal to successively produce count data having a longer length of bits including higher order bits corresponding to the bits of the time data and one or more lower order bit, a synchronizing device that operates upon receipt of the time data to reset the counting device to thereby adjust all bits of the count data in synchronization with the time data, and a controlling device that restores the time-sequential arrangement of the received train of data according to the higher order bits of the adjusted count data while the lower order bit of the count data is used to maintain the synchronous communication between the transmitting node and the receiving node.

In a form, the controlling device comprises a separator that successively separates from the train of data a time stamp which has the shorter length of the bits and indicates the time-sequential arrangement of the train of data, and a comparator that compares each of the separated time stamps with the higher order bits of the adjusted count data to generate a coincidence signal every time the time stamp coincides with the count data. The coincidence signal is used to restore the time-sequential arrangement of the train of data. Further, the controlling device comprises a detector that detects when the counting device carries the lower order bit of the count data to provide a corresponding carry signal, and a gate circuit that is connected to the comparator and gates the coincidence signal in response to the carry signal. The gated coincidence signal is used to restore the time-sequential arrangement of the train of data. Moreover, the controlling device comprises a phase-locked loop circuit that is connected to the gate circuit and produces a read clock signal which is phase-locked by the gated coincidence signal to control restoration of the train of data. In such a case, the phase-locked loop circuit comprises a voltage-controlled oscillator that oscillates to produce the read clock signal at a fast frequency comparable to that of the second clock signal, a frequency-divider that frequency-divides the read clock signal fed back from the voltage-controlled oscillator to a slow frequency comparable to that of the gated coincidence signal, and a phase detector that is connected to the voltage-controlled oscillator to form a phase-locked loop and that detects a phase difference between the gated coincidence signal and the frequency-divided read clock signal to phase-lock the read clock signal.

In another form, the synchronizing device comprises an extractor that extracts the time data from the received train of data, and a register that registers a set of parallel bits including higher order bits allotted to the extracted time data and one or more lower order bit allotted to a default value, and that loads the registered set of parallel bits into the counting device to thereby adjust all bits of the count data in synchronization with the time data.

In a preferred form, the transmitting node transmits a train of digital audio data time-sequentially arranged to provide musical information, and the receiving node restores the musical information as it is from the train of digital audio data by the synchronous communication with the transmitting node.

In operation, one of the nodes connected to the communication network serves as a transmitting node and another node serves as a receiving node. The transmitting node transmits time data and a plurality of data arranged in a train to the network based on a first clock signal. The receiving node generates count data based on a second clock signal having a frequency twice or more higher than that of the first clock signal. For example, if the second clock signal is four times as high as the first clock signal in frequency, the number of bits of the count data produced based on the second clock signal in the receiving node is greater than that of the time data produced based on the first clock signal in the transmitting node by two digits, making the resolution of the count data of the receiving node four times higher than that of the time data of the transmitting node. The receiving node synchronizes all bits (including the above-mentioned 2 extra bits) of the count data with the time data when the same comes from the transmitting node. Therefore, if the phase of the frequencies of the internal oscillators in the transmitting and receiving nodes gradually deviate from each other, the deviation can be limited to about ¼ of the frequency of the first clock signal. If the frequency of the second clock signal is 8 times as high as the frequency of the first clock signal, then the deviation can be limited to about ⅛ of the frequency of the first clock signal. If the same count data is incidentally repeated to correct the count data, the deviation can be limited only to about ¼ of the frequency of the first clock signal. In addition, since the novel system can avoid the count data from skipping in the positive direction for compensation, the receiving node can correctly restore the time-sequential arrangement of the digital audio data or the like.

The above and other objects, features and advantages of the present invention will become more apparent from the accompanying drawings, in which like reference numerals are used to identify the same or similar parts in several views.

DETAILED DESCRIPTION OF THE PREFERRED EMBODIMENTS

Figure 2:
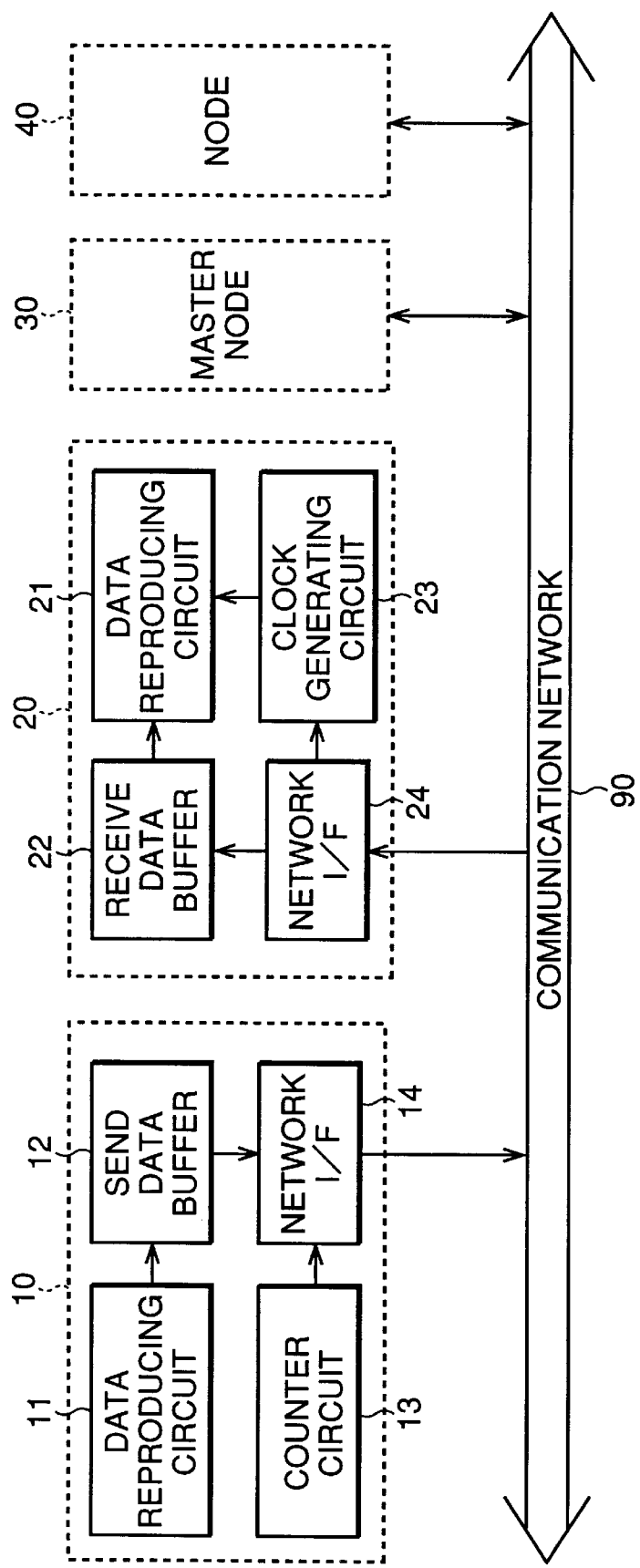
FIG. 2 a block diagram illustrating an overall constitution of the data transfer system practiced as one preferred embodiment of the present invention.
Figure 3:
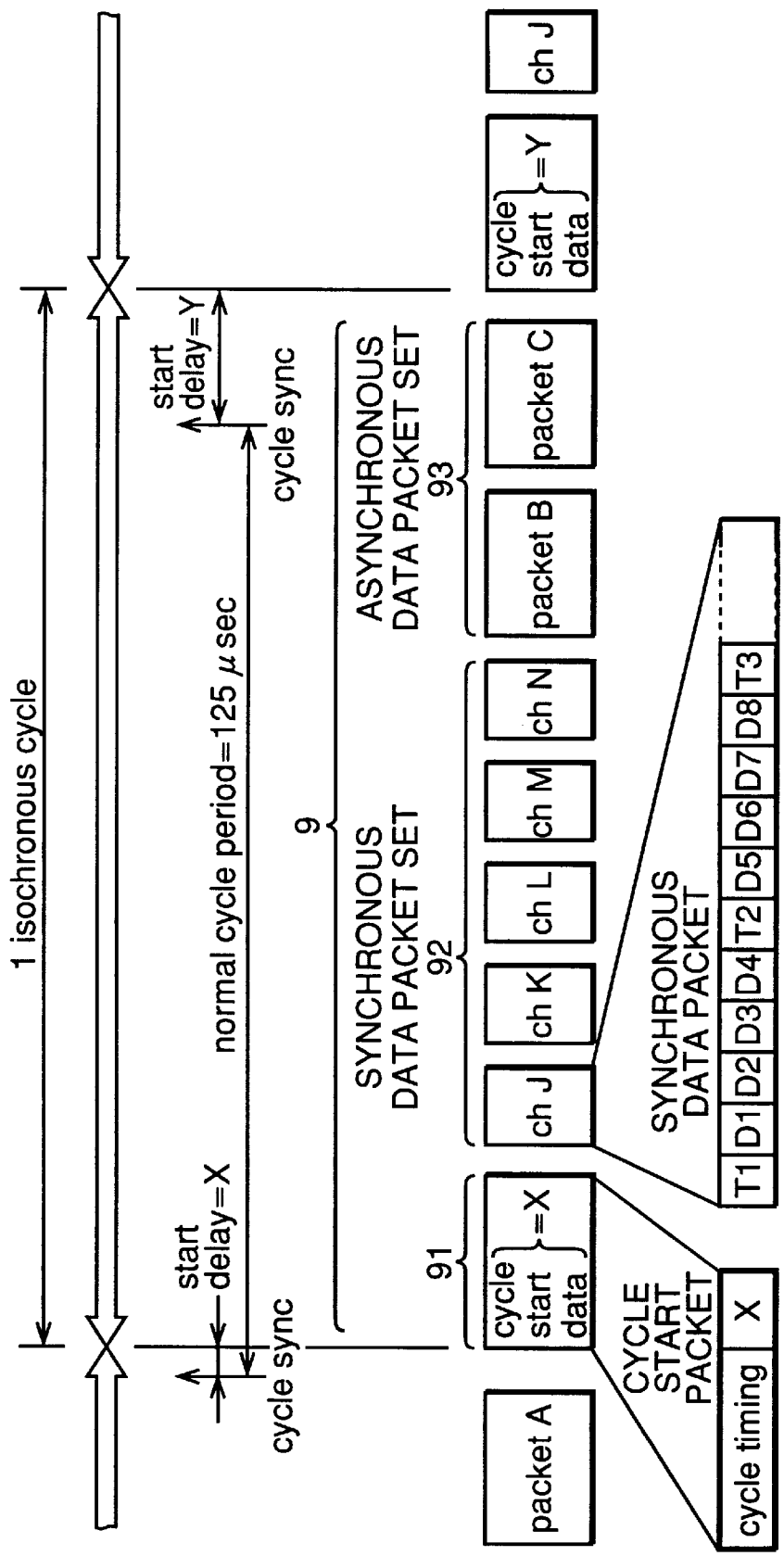
FIG. 3 is a diagram illustrating an example of a format of data transmitted by the data transfer system according to the present invention.

This invention will be described in further detail by way of example with reference to the accompanying drawings. FIG. 2 shows a block diagram illustrating the overall constitution of the data transfer system practiced as one preferred embodiment of the present invention. FIG. 3 shows an example of a format of data to be transmitted by the data transfer system according to the present invention. In this embodiment, data transfer is performed according to a protocol specified by the IEEE1394 communication method.

Now, referring to FIG. 2, a transmitting node 10, a receiving node 20, and other nodes 30 and 40 are interconnected via a communication network 90. In what follows, only the data transfer between the transmitting node 10 and the receiving node 20 will be described for convenience. It will be apparent that many additional nodes may be interconnected via the network. It will also be apparent that the transmitting node and the receiving node alone may be interconnected. It will be still apparent that a group of the transmitting node 10 and the receiving node 20 may be connected to another group of the node 30 and the node 40 for data transfer.

In the present embodiment, the master node 30 sequentially outputs a cycle start packet in the form of a sync signal CYCLE SYNC having a normal cycle period of 125 μsec as shown in FIG. 3. In this case, the transmitting node 10 transmits a data train 9 as shown in FIG. 3 to the communication network 90. The receiving node 20 receives this data train 9 to restore the original data.

In the transmitting node 10, a data reproducing circuit 11 operates based on a first clock signal having a predetermined frequency (for example, 24.576 MHz with a period of about 40 ns) generated by an internal quartz oscillator, not shown. The data reproducing circuit 11 sequentially generates a plurality of bits of data having a time-sequential arrangement at a predetermined sampling period T. For example, the data reproducing circuit 11 reproduces sequential sample data of a digital audio signal. The data reproducing circuit 11 may comprise an audio reproducing apparatus such as a CD (Compact Disc) player and a musical sound synthesizer that synthesizes musical sound sample data in a real-time manner. The sampling period T of the data outputted from the data reproducing circuit 11 may be varied according to the source of the data.

The data outputted from the data reproducing circuit 11 are temporarily held in a send data buffer 12 in time sequence. The send data buffer 12 is a buffer register that performs input/output operations asynchronously. A counter circuit 13 generates time stamp data. The circuit 13 is a 32-bit running counter for counting the first clock signal having a predetermined frequency generated by the quartz oscillator, not shown. A network interface (I/F) 14 operates in synchronization with a predetermined transmission interrupt period determined by the sync signal CYCLE SYNC outputted from the master node 30 for transmitting the data train 9 (hereafter, referred to as "cycle packet train") within one isochronous cycle as shown in FIG. 3. Namely, the network interface 14 processes the data temporarily held in the send data buffer 12, and transmits the constructed cycle packet train to the communication network 90.

As shown in FIG. 3, the cycle packet train 9 is composed of a cycle start packet 91, a synchronous data packet set 92, and an asynchronous data packet set 93. The cycle start packet 91 is made up of 32 bits, the high-order 20 bits indicating the cycle timing of the cycle packet train 9 while the low-order 12 bits indicating the cycle start data X that denotes a time lag by which the cycle packet train 9 is transmitted to the communication network 90 behind the CYCLE SYNC signal. The synchronous data packet set 92 is composed of P pieces of data packets subjected to the pseudo synchronous processing. In the figure, five synchronous data packets are shown corresponding to channel J to channel N. The number P the of synchronous data packets is variable as required. Further, each synchronous data packet has a plurality of data groups each composed of Q pieces of data and one piece of time stamp data indicating the time position of any one of the Q pieces of data. In the present embodiment, one group is composed of four pieces of data and one piece of time stamp data. To be specific, as shown in FIG. 3, time stamp data T1 is provided for four pieces of data D1 through D4, and time stamp data T2 is provided for four pieces of data D5 through D8. The time stamp data T1 indicates the time position of the first data D1, and the time stamp data T2 indicates the time position of the data D5. Therefore, each synchronous data packet is composed of a plurality of groups each having (Q+1) pieces of data. It should be noted that a synchronous packet may be transmitted even if the number of pieces of data is smaller than Q.

The asynchronous data packet set 93 is composed of R number of data packets subjected to asynchronous data transfer processing. In the figure, this asynchronous set 93 is composed of two packets B and C, for example. It will be apparent that no synchronous data packet may be included in the cycle packet train 9.

In the receiving node 20, a network interface (I/F) 24 receives the cycle packet train 9 coming over the communication network 90, and temporarily holds the received cycle packet train 9 in time sequence. A receive data buffer 22 is a buffer register that performs input/output operations asynchronously. A clock generating circuit 23 restores the same original sampling period T as the data supplied from the data reproducing circuit 11 of the transmitting node 10, based on the cycle start data X contained in the cycle start packet of the received cycle packet train 9. A data reproducing circuit 21 sequentially reads out the data temporarily held in the receive data buffer 22 according to the restored sampling period T given from the clock generating circuit 23. The data thus read is used appropriately. The restored data can be used in any manner. For example, the restored data can be converted from a digital form into an analog form to be sounded from a speaker or the like. Alternatively, the restored data can be provided with sound effects before sounded from a speaker or the like. Otherwise, the audio data applied with the sound effects can be transmitted outside.

Figure 1:
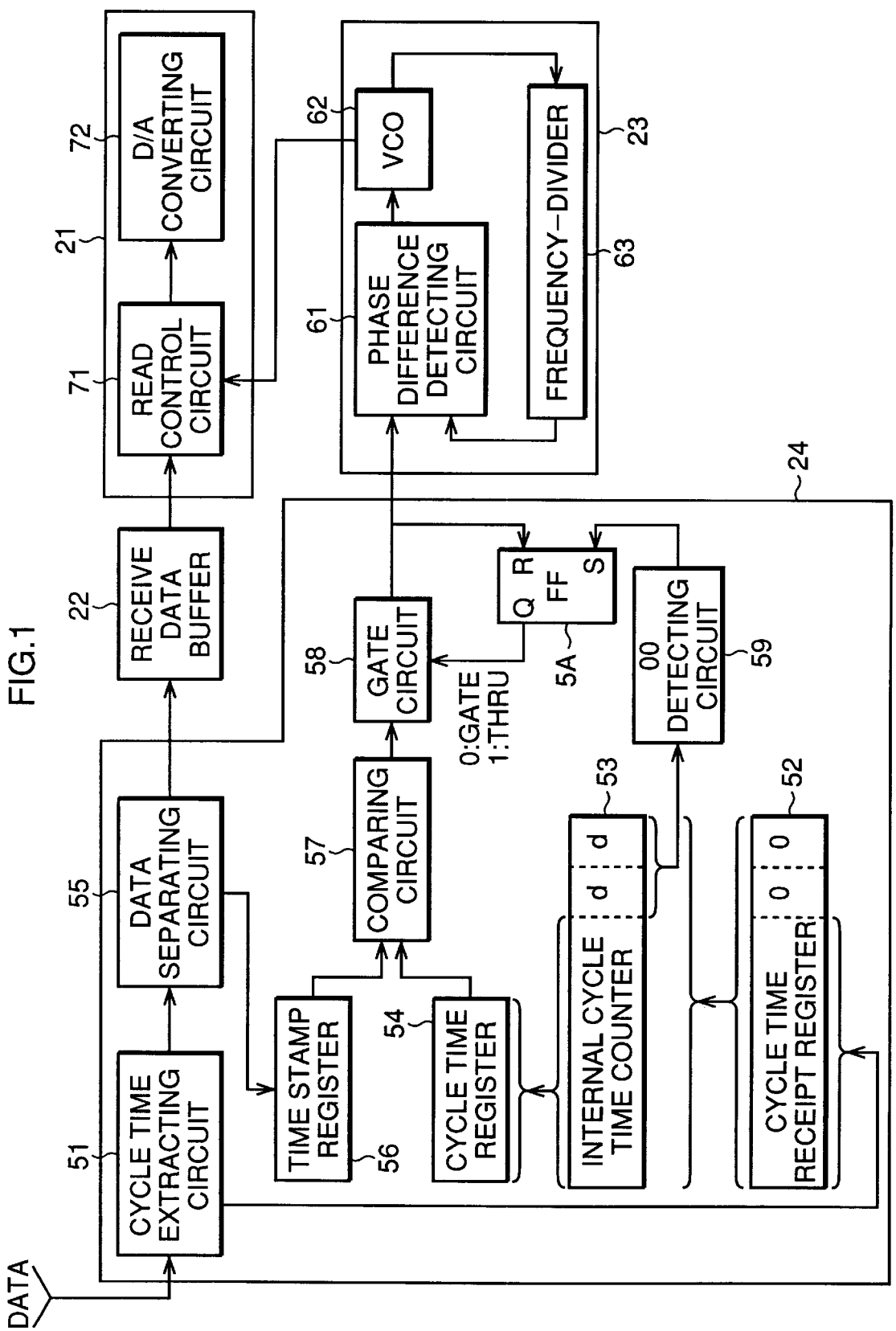
FIG. 1 is a block diagram illustrating details of a receiving node involved in the inventive data transfer system.

The following describes a detailed constitution of the receiving node 20 with reference to FIG. 1. Referring to FIG. 1, a cycle time extracting circuit 51 included in the network interface 24 extracts the cycle start packet 91 from the transmitted cycle packet train 9. The extracting circuit 51 outputs the extracted cycle start data to a cycle time receipt register 52, and outputs the synchronous data packet set 92 and the asynchronous data packet set 93 to a data separating circuit 55.

The cycle time receipt register 52 is a 34-bit register, the low-order two bits of the register being set to a constant "00". The high-order 32 bits of the register temporarily latch the 32-bit cycle start data extracted by the cycle time extracting circuit 51. Further, this register 52 transfers the 34-bit data to an internal cycle time counter 53 as it is. The internal cycle time counter 53 is a 34-bit counter for counting a second clock signal having an oscillation frequency of 98.304 MHz with a period of about 10 ns outputted from a quartz oscillator incorporated in the receiving node 20. The contents of this counter 53 are reset by the data transferred from the cycle time receipt register 52. It should be noted that the contents of the counter 53 may be reset only when the 34-bit time value of the cycle time receipt register 52 differs from the 34-bit count value of the internal cycle time counter 53. A cycle time register 54 always latches a count value of the high-order 32 bits of the internal cycle time counter 53. Therefore, if the count value of the high-order 32 bits of the internal cycle time counter 53 changes or reset, the value of the cycle time register 54 is changed accordingly.

Figure 4:
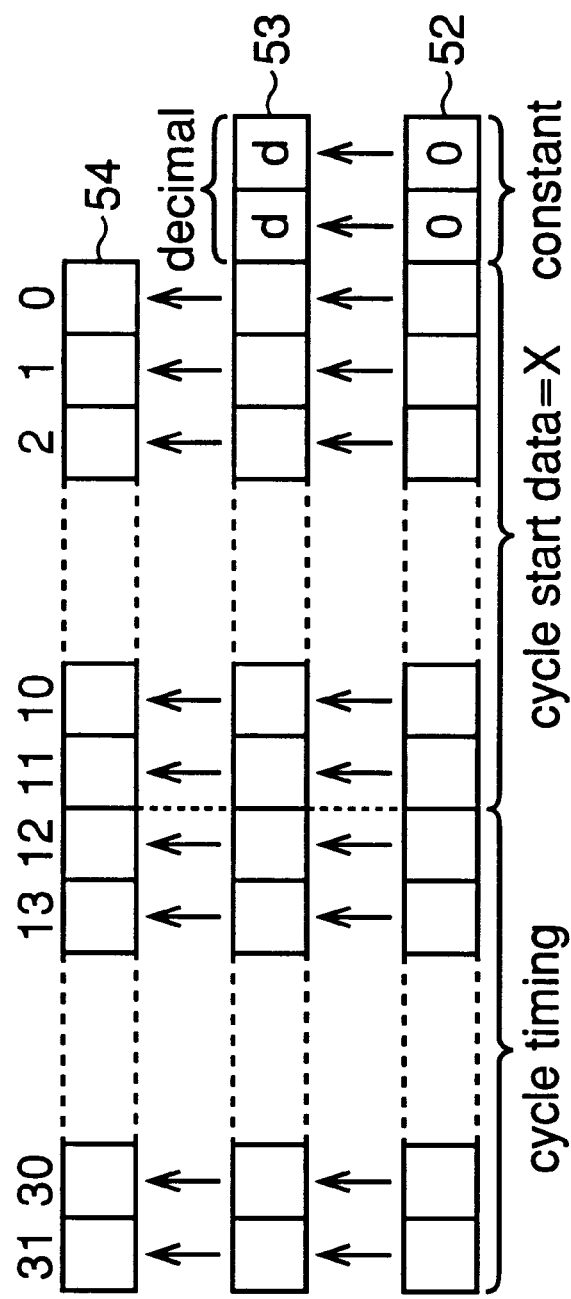
FIG. 4 is a diagram illustrating the relationship among a cycle time receipt register, an internal cycle time counter, and a cycle time register shown in FIG. 1.

The relationship among the cycle time receipt register 52, the internal cycle time counter 53, and the cycle time register 54 is shown in FIG. 4. As seen from the figure, the 34-bit data of the cycle time receipt register 52 is outputted to the internal cycle time counter 53 as it is. The data of the high-order 32 bits of the internal cycle time counter 53 is outputted to the cycle time register 54 as it is.

A data separating circuit 55 separates 32-bit time stamp data from the synchronous data packet. The data separating circuit 55 outputs the separated time stamp data to a time stamp register 56, and outputs the remaining data to the receive data buffer 22. For example, if one piece of time stamp data T1 is provided for four pieces of data D1 through D4 as shown in FIG. 3, the time stamp data T1 preceding the four pieces of data D1 through D4 is outputted to the time stamp register 56, and the subsequent four pieces of data D1 through D4 are outputted to the receive data buffer 22. It should be noted that the data separating circuit 55 performs nothing on the data packets contained in the asynchronous data packet set, and therefore transfers the asynchronous packet data to the receive data buffer 22 as it is.

The time stamp register 56 temporarily holds the 32-bit time stamp data T1 separated from the other data by the data separating circuit 55. A comparing circuit 57 compares the value held in the cycle time register 54 with the value held in the time stamp register 56. If a match is found, the comparing circuit 57 outputs a coincidence signal to a phase difference detecting circuit 61 of the clock generating circuit 23 via a gate circuit 58. The gate circuit 58 is placed in an open state where the coincidence signal outputted from the comparing circuit 57 is outputted to the phase difference detecting circuit 61 without change, when the output of a flip-flop circuit 5A is at high level "1". Conversely, when the output of the flip-flop circuit 5A is at low level "0", the gate circuit 58 is placed in a closed state where the output of the comparing circuit 57 is blocked.

A detecting circuit 59 detects whether the value of the low-order two bits of the internal cycle time counter 53 reaches "00". When the value reaches "00", the detecting circuit 59 outputs a set signal to the set terminal S of the flip-flop circuit 5A, thereby setting the output Q of the flip-flop circuit to high level "1". The flip-flop circuit 5A receives at the set terminal S the detection signal from the detecting circuit 59, and receives at the reset terminal R the coincidence signal from the comparing circuit 57 via the gate circuit 58, while the flip-flop circuit 5A feeds the output Q to a gate control terminal of the gate circuit 58.

The clock generating circuit 23 is a PLL (Phase Locked Loop) circuit composed of a phase difference detecting circuit 61, a VCO (Voltage-controlled Oscillator) 62, and a 1/Q frequency-divider 63. The clock generating circuit 23 operates based on the coincidence signal coming from the comparing circuit 57 via the gate circuit 58. The integer Q denotes the number of data pieces constituting one group contained in the synchronous data packet as described earlier. Therefore, if the number Q of data pieces is 4, a ¼ frequency-divider is used. If Q is 8, a ⅛ frequency-divider is used.

The data reproducing circuit 21 is composed of a read control circuit 71 and a D/A converting circuit 72. The read control circuit 71 operates in synchronization with a read clock coming from the VCO 62 of the clock generating circuit 23 for reading the data held in the receive buffer 22 and for outputting the read data to the D/A converting circuit 72. The D/A converting circuit 72 converts the digital data read by the read control circuit 71 into an analog signal.

Figure 5:
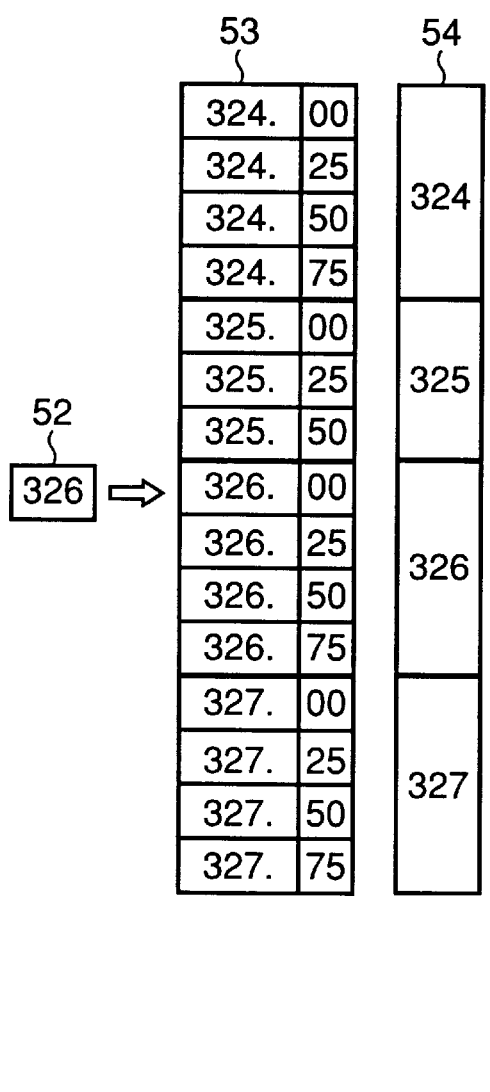
FIG. 5(A) is another diagram illustrating how the values of the cycle time receipt register, the internal cycle time counter, and the cycle time register vary along a time axis.
FIG. 5(B) is a diagram illustrating how the values of the cycle time receipt register, the internal cycle time counter, and the cycle time register vary along a time axis.
Figure 5:
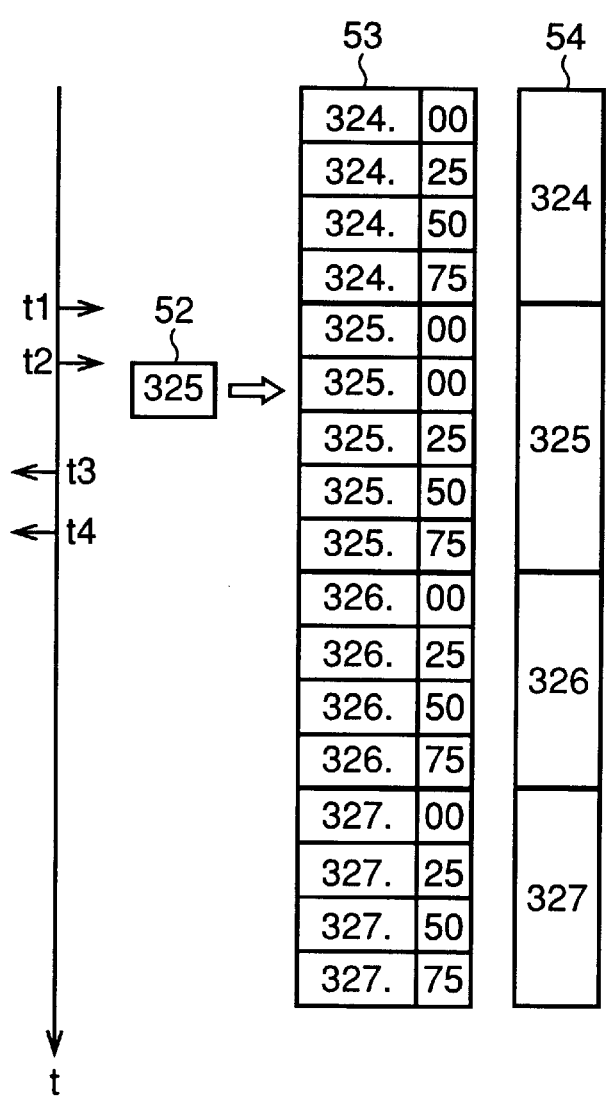

The following describes the operation of the receiving node 20 of FIG. 1 with reference to FIG. 5(A) and FIG. 5(B). FIG. 5(A) and FIG. 5(B) show how the values of the cycle time receipt register 52, the internal cycle time counter 53 and the cycle time register 54 change along a time axis. To be specific, FIG. 5(A) shows a situation in which the quartz oscillator in the transmitting node 10 oscillates slightly faster than the other quartz oscillator in the receiving node 20. FIG. 5(B) shows another situation in which the quartz oscillator in the transmitting node 10 oscillates slightly slower than the other quartz oscillator in the receiving node 20.

First, the case of FIG. 5(A) will be described. If the quartz oscillator in the receiving node 20 oscillates slightly slower than the quartz oscillator in the transmitting node 10, the counting operation of the internal cycle time counter 53 is gradually delayed relative to the operation of the transmitting node 10. Thus, when the cycle start packet is received, the current count value should be smaller than the value of the cycle start data X represented by low-order 12 bits included in the received cycle start packet. This is called a delay state. If there were no delay, the cycle start packet including the cycle start data X of time value "326" should be extracted by the cycle time extracting circuit 51 at timing t4 at which the count value of the internal cycle time counter 53 is "326.00". Actually, however, in the delayed state, the cycle start packet is extracted at timing t3 at which the count value of the cycle time counter 53 is "325.75". In such a delayed case, the value of the internal cycle time counter 53 is reset to "326.00" at timing t3 when the cycle start data X is extracted. Thereafter, the regular count-up operation is sequentially performed based on the internal clock signal generated by the internal quartz oscillator. Thus, the cycle time register 54 is adjusted by the cycle start data X.

As a result of the above-mentioned time data reset processing of the internal cycle time counter 53, the value of the cycle time register 54 advances by one clock of the quartz oscillator in the node 20. Also, the output timing of the coincidence signal from the comparing circuit 57 is made slightly longer. However, this error is absorbed by the operation of the PLL circuit constituting the clock generating circuit 23. It should be noted that the numeral under the decimal point of the count value corresponds to the lowest two bits in the binary notation. However, in the figure, the decimal notation is used such as "0.25", "0.50", and "0.75" for better understanding.

The following describes the case of FIG. 5(B). If the quartz oscillator in the transmitting node 10 oscillates at a frequency slightly higher than that at which the other quartz oscillator in the receiving node 20 oscillates. The counting operation of the internal cycle time counter 53 gradually advances relative to the operation of the transmitting node. When the cycle start packet is received, the current count value is greater than the value of the cycle start data X represented by the low-order 12 bits included in the received cycle start packet. This is called an advanced state. If there were no advance, the cycle start packet including the cycle start data X of time value "325" should be extracted by the cycle time extracting circuit 51 at timing t1 at which the count value of the internal cycle time counter 53 is "325.00". Actually, however, in the advanced state, the data X is extracted at timing t2 when the count value of the cycle time counter 53 is "325.25". Therefore, at timing t2 when the cycle start data X is extracted, the count value of the internal cycle time counter 53 is reset to "325.00" according to the invention. Thereafter, the regular count-up operation is sequentially performed based on the clock signal generated by the internal quartz oscillator. In the advanced state, the value of the cycle time register 54 is not changed as a result of the data reset processing of the internal cycle time counter, but it is detected by the detecting circuit 59 that the value of the low-order two bits of the internal cycle time counter 53 has been reset to "00". To be specific, the detecting circuit 59 detects "00" in a short period between t2 and t1, and outputs a set signal to the set terminal S of the flip-flop circuit 5A, thereby setting the output Q of the flip-flop circuit 5A to high level "1". Consequently, a pair of coincidence signals are continuously outputted in a short period from the comparing circuit 57 to the clock generating circuit 23. This error can be absorbed by the operation of the clock generating circuit 23 or the PLL circuit, thereby causing no adverse effect.

As a result of the data reset operation of the internal cycle time counter 53, the value of the cycle time register 54 is delayed by one clock of the quartz oscillator in the node 20. Also, the output timing of the coincidence signal from the comparing circuit 57 deviates. However, this error can be absorbed by the operation of the clock generating circuit 23 or the PLL circuit.

According to the above-mentioned embodiment, the skipping of the internal cycle time counter 53 is eliminated, thereby simplifying the construction of the comparing circuit 57 for making comparison between the values of the time stamp register 56 and the cycle time register 54. At the same time, the inventive system can reduce jitters of digital audio data. Further, because the internal cycle time counter 53 is adjusted under the decimal point, the jitter of the digital audio data is distributed along the time axis, thereby facilitating filtering operation in the clock generating circuit 23 or the PLL circuit.

In the above-mentioned embodiment, the number of pieces of data constituting one group in the synchronous data packet is four. It will be apparent that this number may be any of three or higher. In addition, it is preferable that Q be expressed in a power of 2 because frequency dividing operation can be simplified. It will be also apparent that any data having no time stamp may be added with time data unique to each piece of data, the unique time data being referenced for time-sequential data restoration. In the above-mentioned embodiment, the low-order two bits are added to the internal cycle time counter by increasing the count clock by four times. It will be apparent that a register of the low-order two bits may be provided separately from the cycle time counter. In the above-mentioned embodiment, the receiving node operates at the frequency (98.304 KHz) four times as high as the frequency of the transmitting node. It will be apparent that, if required, the transmitting node may operate at the same frequency (98.304 KHz) as that of the receiving node, while the transmitting node may transmit data over the communication network at the normal frequency (24.576 KHz). In the above-mentioned embodiment, when the cycle start data X of the low-order 12 bits included in the cycle start packet is received, the value of the internal cycle time counter 53 is reset with the value of the cycle time receipt register 52. It will be apparent that the time stamp data may be extracted from the packet data constituting the synchronous data packet train to perform the same reset operation.

For summary, in the disclosed embodiment, the inventive data transfer system comprises a plurality of nodes 10, 20, 30 and 40 each having an internal oscillating circuit to generate a clock signal. The plurality of the nodes are connected to one another through a communication network 90 and operate asynchronously with one another according to the respective clock signals. One node 30 supplies a synchronization signal CYCLE SYNC indicative of a reference time to the communication network 90. The plurality of the nodes include a transmitting node 10 that transmits a train 9 of data having a timesequential arrangement together with time data X indicative of a time lag relative to the reference time, and a receiving node 20 that receives the train 9 of dada together with the time data X by which synchronous communication of the train of data can be ensured between the transmitting node 10 and the receiving node 20. The transmitting node 10 internally generates a first clock signal and transmits the train 9 of data time-sequentially arranged according to the first clock signal together with the time data X which has a shorter length of bits. The in receiving node 20 comprises a counting device 53 that counts a second clock signal internally generated at a frequency at least twice as fast as that of the first clock signal to successively produce count data having a longer length of bits including higher order bits corresponding to the bits of the time data X and one or more lower order bit, a synchronizing device that operates upon receipt of the time data X to reset the counting device 53 to thereby adjust all bits of the count data in synchronization with the time data X, and a controlling device that restores the time-sequential arrangement of the received train 9 of data according to the higher order bits of the adjusted count data while the lower order bit of the count data is used to maintain the synchronous communication between the transmitting node 10 and the receiving node 20.

In a form, the controlling device comprises a separator 55 that successively separates from the train 9 of data a time stamp which has the shorter length of the bits and indicates the time-sequential arrangement of the train 9 of data, and a comparator 57 that compares each of the separated time stamps with the higher order bits of the adjusted count data to generate a coincidence signal every time the time stamp coincides with the count data. The coincidence signal is used to restore the time-sequential arrangement of the train of data. Further, the controlling device comprises a detector 59 that detects when the counting device carries the lower order bit of the count data to provide a corresponding carry signal, and a gate circuit 58 that is connected to the comparator 57 and gates the coincidence signal in response to the carry signal. The gated coincidence signal is used to restore the time-sequential arrangement of the train of data. Moreover, the controlling device comprises a phase-locked loop circuit 23 that is connected to the gate circuit 58 and produces a read clock signal which is phase-locked by the gated coincidence signal to control restoration of the train of data. In such a case, the phase-locked loop circuit 23 comprises a voltage-controlled oscillator 62 that oscillates to produce the read clock signal at a fast frequency comparable to that of the second clock signal, a frequency-divider 63 that frequency-divides the read clock signal fed back from the voltage-controlled oscillator 62 to a slow frequency comparable to that of the gated coincidence signal, and a phase detector 61 that is connected to the voltage-controlled oscillator 62 to form a phase-locked loop and that detects a phase difference between the gated coincidence signal and the frequency-divided read clock signal to phase-lock the read clock signal.

In another form, the synchronizing device comprises an extractor 51 that extracts the time data X from the received train 9 of data, and a register 52 that registers a set of parallel bits including higher order bits allotted to the extracted time data X and one or more lower order bit allotted to a default value, and that loads the registered set of parallel bits into the counting device 53 to thereby adjust all bits of the count data in synchronization with the time data X.

In a preferred form, the transmitting node 10 transmits a train of digital audio data time-sequentially arranged to provide musical information, and the receiving node 20 restores the musical information as it is from the train of digital audio data by the synchronous communication with the transmitting node 10.

Figure 6:
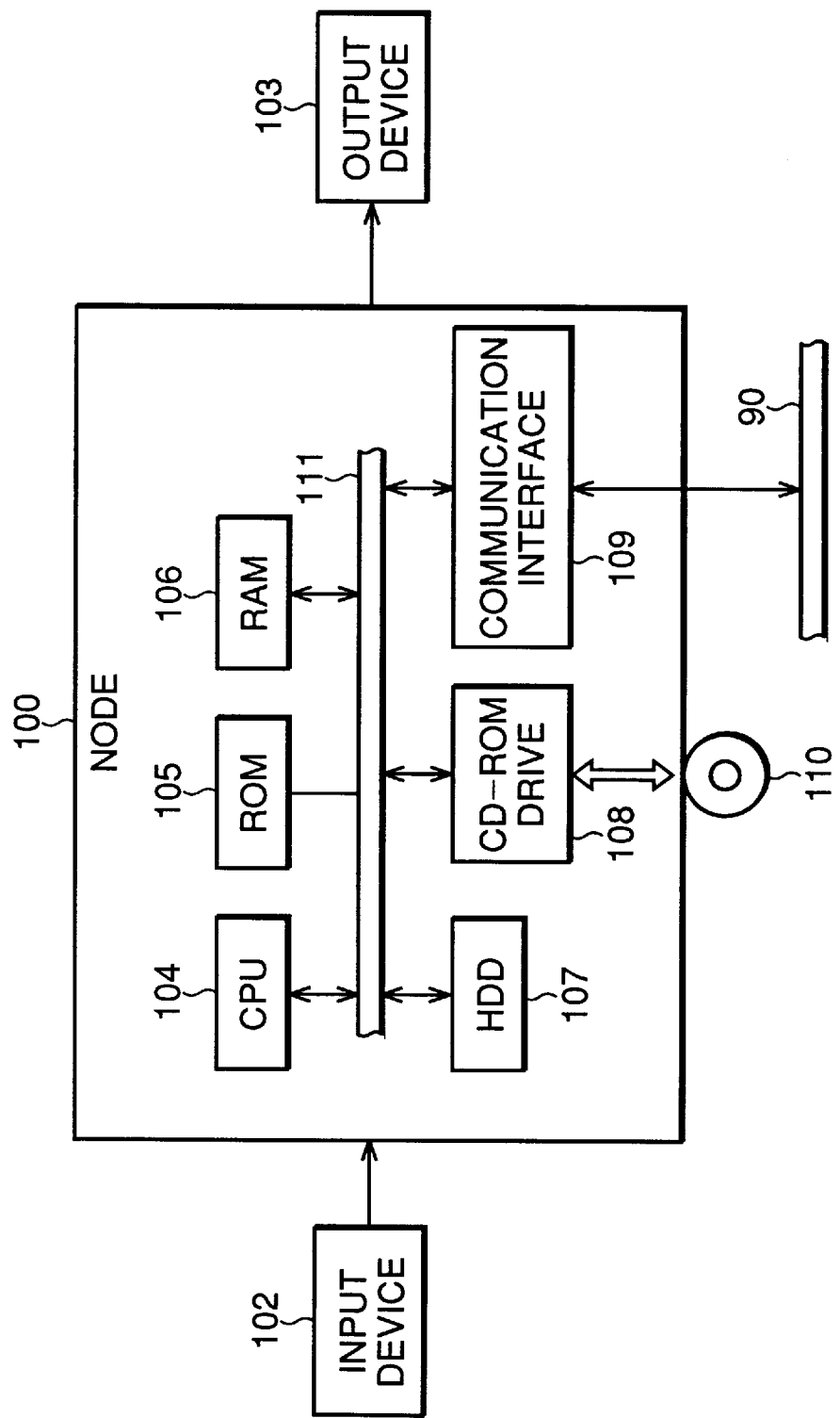
FIG. 6 is a block diagram showing an embodiment of a node involved in the inventive data transfer system.

FIG. 6 shows an additional embodiment of the node involved in the inventive data transfer system. The node 100 has an input device 102 and an output device 103 for successively transmits or receives audio data in response to a command inputted by the input device 102. The received audio data are sounded from the output device 103. The node 100 is implemented by a personal computer composed of CPU 104, ROM 105, RAM 106, HDD (hard disk drive) 107, CD-ROM drive 108, and communication interface 109. The storage such as ROM 105 and HDD 107 can store various data and various programs including an operating system program and an application program which is executed to process the audio data in continuous manner. Normally, the ROM 105 or HDD 107 provisionally stores these programs. However, if not, any program may be loaded into the node 100. The loaded program is transferred to the RAM 106 to enable the CPU 104 to operate the node 100. By such a manner, new or version-up programs can be readily installed in the system. For this purpose, a machine readable media such as a CD-ROM (Compact Disc Read Only Memory) 110 is utilized to install the program. The CD-ROM 110 is set into the CD-ROM drive 108 to read out and download the program from the CD-ROM 108 into the HDD 107 through an internal bus 111. The machine readable media may be composed of a magnetic disk or an optical disk other than the CD-ROM 110. A communication interface 109 is connected to other nodes through a communication network 90 such as LAN (Local Area Network), public telephone network and INTERNET. The communication interface 109 is activated to receive or transmit the data. The CPU 104 transmits the data through the interface 109 and the network 90 to other nodes. Other nodes may transmit data to the node 100.

The node 100 can be implemented by the personal computer machine which is installed with the needed data and programs. In such a case, the data and programs are provided to the user by means of the machine readable media such as the CD-ROM 110 or a floppy disk. The machine readable media contains instructions for causing a plurality of machines to perform a data transfer method. Each machine has an oscillating circuit to generate an internal clock signal. The plurality of the machines are connected to one another through a communication network and operate asynchronously with one another according to the respective internal clock signals. One of the machines supplies a synchronization signal indicative of a reference time to the network. The plurality of the machines include a transmitting machine that transmits a train of data having a time-sequential arrangement together with time data indicative of a time lag relative to the reference time, and a receiving machine that receives the train of dada together with the time data by which synchronous communication of the train of data can be ensured between the transmitting machine and the receiving machine.

The data transfer method comprises the steps of operating the transmitting machine according to a slow internal clock signal to transmit the train of data together with the time data which is represented by a shorter length of bits in correspondence with the slow internal clock signal, operating the receiving machine for counting a fast internal clock signal to successively generate count data which is represented by a longer length of bits in correspondence with the fast internal clock signal, resetting the count data upon receipt of the time data for adjusting all bits of the count data in synchronization with the time data, the count data including higher order bits corresponding to the bits of the time data and one or more lower order bit, and restoring the time-sequential arrangement of the received train of data according to the higher order bits of the adjusted count data while the lower order bit of the count data is used to maintain the synchronous communication between the transmitting machine and the receiving machine.

In a form, the step of restoring comprises successively separating from the train of data a time stamp which has the shorter length of the bits and indicates the time-sequential arrangement of the train of data, comparing each of the separated time stamps with the higher order bits of the adjusted count data to generate a coincidence signal every time the time stamp coincides with the count data, and responding to the coincidence signal to restore the time-sequential arrangement of the train of data In another form, the step of restoring further comprises detecting when the lower order bit of the count data is carried in order to provide a corresponding carry signal, and gating the coincidence signal in response to the carry signal to restore the time-sequential arrangement of the train of data.

In still another form, the step of resetting comprises extracting the time data from the received train of data, registering a set of parallel bits including higher order bits allotted to the extracted time data and one or more lower order bit allotted to a default value, and rewriting the count data by the registered set of parallel bits to thereby adjust all bits of the count data in synchronization with the time data.

As described and according to the present invention, the count value skip can be eliminated, which would be otherwise caused by the deviation in frequency between the clock oscillators provided in the nodes in a communication network, thereby correctly restoring the original data.

While the preferred embodiment of the present invention has been described using specific terms, such description is for illustrative purposes only, and it is to be understood that changes and variations may be made without departing from the spirit or scope of the appended claims.

What is claimed is:

1. A data transfer system comprising a plurality of nodes each having an internal oscillating circuit to generate a clock signal, the plurality of the nodes being connected to one another through a communication network and operating asynchronously with one another according to the respective clock signals, one of the nodes supplying a synchronization signal indicative of a reference time to the communication network, the plurality of the nodes including a transmitting node that transmits a train of data having a time-sequential arrangement together with time data indicative of a time lag relative to the reference time, and a receiving node that receives the train of dada together with the time data by which synchronous communication of the train of data can be ensured between the transmitting node and the receiving node, wherein:

the transmitting node internally generates a first clock signal and transmits the train of data time-sequentially arranged according to the first clock signal together with the time data which has a shorter length of bits; and wherein the receiving node comprises a counting device that counts a second clock signal internally generated at a frequency at least twice as fast as that of the first clock signal to successively produce count data having a longer length of bits including higher order bits corresponding to the bits of the time data and one or more lower order bit, a synchronizing device that operates upon receipt of the time data to reset the counting device to thereby adjust all bits of the count data in synchronization with the time data, and a controlling device that restores the time-sequential arrangement of the received train of data according to the higher order bits of the adjusted count data while the lower order bit of the count data is used to maintain the synchronous communication between the transmitting node and the receiving node.

2. A data transfer system according to claim 1, wherein the controlling device comprises a separator that successively separates from the train of data a time stamp which has the shorter length of the bits and indicates the time-sequential arrangement of the train of data, and a comparator that compares each of the separated time stamps with the higher order bits of the adjusted count data to generate a coincidence signal every time the time stamp coincides with the count data, the coincidence signal being used to restore the time-sequential arrangement of the train of data.

3. A data transfer system according to claim 2, wherein the controlling device further comprises a detector that detects when the counting device carries the lower order bit of the count data to provide a corresponding carry signal, and a gate circuit that is connected to the comparator and gates the coincidence signal in response to the carry signal, the gated coincidence signal being used to restore the time-sequential arrangement of the train of data.

4. A data transfer system according to claim 3, wherein the controlling device further comprises a phase-locked loop circuit that is connected to the gate circuit and produces a read clock signal which is phase-locked by the gated coincidence signal to control restoration of the train of data.

5. A data transfer system according to claim 4, wherein the phase-locked loop circuit comprises a voltage-controlled oscillator that oscillates to produce the read clock signal at a fast frequency comparable to that of the second clock signal, a frequency-divider that frequency-divides the read clock signal fed back from the voltage-controlled oscillator to a slow frequency comparable to that of the gated coincidence signal, and a phase detector that is connected to the voltage-controlled oscillator to form a phase-locked loop and that detects a phase difference between the gated coincidence signal and the frequency-divided read clock signal to phase-lock the read clock signal.

6. A data transfer system according to claim 1, wherein the synchronizing device comprises an extractor that extracts the time data from the received train of data, and a register that registers a set of parallel bits including higher order bits allotted to the extracted time data and one or more lower order bit allotted to a default value, and that loads the registered set of parallel bits into the counting device to thereby adjust all bits of the count data in synchronization with the time data.

7. A data transfer system according to claim 1, wherein the transmitting node transmits a train of digital audio data time-sequentially arranged to provide musical information, and the receiving node restores the musical information as it is from the train of digital audio data by the synchronous communication with the transmitting node.

8. A data transfer system comprising a plurality of nodes each having an oscillating circuit to generate an internal clock signal, the plurality of the nodes being connected to one another through a communication network and operating asynchronously with one another according to the respective internal clock signals, one of the nodes supplying a synchronization signal indicative of a reference time to the network, the plurality of the nodes including a transmitting node that transmits a train of data having a time-sequential arrangement together with time data indicative of a time lag relative to the reference time, and a receiving node that receives the train of dada together with the time data by which synchronous communication of the train of data can be ensured between the transmitting node and the receiving node, wherein:

the transmitting node operates according to a slow internal clock signal to transmit the train of data together with the time data which is represented by a shorter length of bits in correspondence with the slow internal clock signal; and the receiving node comprises counting means for counting a fast internal clock signal to successively generate count data which is represented by a longer length of bits in correspondence with the fast internal clock signal, synchronizing means operative upon receipt of the time data to reset the counting means for adjusting all bits of the count data in synchronization with the time data, the count data including higher order bits corresponding to the bits of the time data and one or more lower order bit, and controlling means operative according to the higher order bits of the adjusted count data to restore the time-sequential arrangement of the received train of data while the lower order bit of the count data is used to maintain the synchronous communication between the transmitting node and the receiving node.

9. A data transfer system according to claim 8, wherein the controlling means comprises separator means for successively separating from the train of data a time stamp which has the shorter length of the bits and indicates the time-sequential arrangement of the train of data, comparator means for comparing each of the separated time stamps with the higher order bits of the adjusted count data to generate a coincidence signal every time the time stamp coincides with the count data, and restoring means responsive to the coincidence signal for restoring the time-sequential arrangement of the train of data.

10. A data transfer system according to claim 9, wherein the controlling means further comprises detector means for detecting when the counting means carries the lower order bit of the count data to provide a corresponding carry signal, and gate means connected to the comparator means for gating the coincidence signal in response to the carry signal to the restoring means.

11. A data transfer system according to claim 9, wherein the synchronizing means comprises extractor means for extracting the time data from the received train of data, register means for registering a set of parallel bits including higher order bits allotted to the extracted time data and one or more lower order bit allotted to a default value, and reset means for loading the registered set of parallel bits into the counting means to thereby adjust all bits of the count data in synchronization with the time data.

12. A data transfer system according to claim 9, wherein the transmitting node transmits a train of digital audio data time-sequentially arranged to provide musical information, and the receiving node restores the musical information as it is from the train of digital audio data by the synchronous communication with the transmitting node.

13. A data transfer method performed among a plurality of nodes each having an oscillating circuit to generate an internal clock signal, the plurality of the nodes being connected to one another through a communication network and operating asynchronously with one another according to the respective internal clock signals, one of the nodes supplying a synchronization signal indicative of a reference time to the network, the plurality of the nodes including a transmitting node that transmits a train of data having a time-sequential arrangement together with time data indicative of a time lag relative to the reference time, and a receiving node that receives the train of dada together with the time data by which synchronous communication of the train of data can be ensured between the transmitting node and the receiving node, the method comprising the steps of:

operating the transmitting node according to a slow internal clock signal to transmit the train of data together with the time data which is represented by a shorter length of bits in correspondence with the slow internal clock signal, operating the receiving node for counting a fast internal clock signal to successively generate count data which is represented by a longer length of bits in correspondence with the fast internal clock signal, resetting the count data upon receipt of the time data for adjusting all bits of the count data in synchronization with the time data, the count data including higher order bits corresponding to the bits of the time data and one or more lower order bit, and restoring the time-sequential arrangement of the received train of data according to the higher order bits of the adjusted count data while the lower order bit of the count data is used to maintain the synchronous communication between the transmitting node and the receiving node.

14. A data transfer method according to claim 13, wherein the step of restoring comprises successively separating from the train of data a time stamp which has the shorter length of the bits and indicates the time-sequential arrangement of the train of data, comparing each of the separated time stamps with the higher order bits of the adjusted count data to generate a coincidence signal every time the time stamp coincides with the count data, and responding to the coincidence signal to restore the time-sequential arrangement of the train of data.

15. A data transfer method according to claim 14, wherein the step of restoring further comprises detecting when the lower order bit of the count data is carried in order to provide a corresponding carry signal, and gating the coincidence signal in response to the carry signal to restore the time-sequential arrangement of the train of data.

16. A data transfer method according to claim 13, wherein the step of resetting comprises extracting the time data from the received train of data, registering a set of parallel bits including higher order bits allotted to the extracted time data and one or more lower order bit allotted to a default value, and rewriting the count data by the registered set of parallel bits to thereby adjust all bits of the count data in synchronization with the time data.

17. A data transfer method according to claim 13, wherein the transmitting node transmits a train of digital audio data time-sequentially arranged to provide musical information, and the receiving node restores the musical information as it is from the train of digital audio data by the synchronous communication with the transmitting node.

18. A machine readable media containing instructions for causing a plurality of machines to perform a data transfer method, each machine having an oscillating circuit to generate an internal clock signal, the plurality of the machines being connected to one another through a communication network and operating asynchronously with one another according to the respective internal clock signals, one of the machines supplying a synchronization signal indicative of a reference time to the network, the plurality of the machines including a transmitting machine that transmits a train of data having a time-sequential arrangement together with time data indicative of a time lag relative to the reference time, and a receiving machine that receives the train of dada together with the time data by which synchronous communication of the train of data can be ensured between the transmitting machine and the receiving machine, the data transfer method comprising the steps of:

operating the transmitting machine according to a slow internal clock signal to transmit the train of data together with the time data which is represented by a shorter length of bits in correspondence with the slow internal clock signal, operating the receiving machine for counting a fast internal clock signal to successively generate count data which is represented by a longer length of bits in correspondence with the fast internal clock signal, resetting the count data upon receipt of the time data for adjusting all bits of the count data in synchronization with the time data, the count data including higher order bits corresponding to the bits of the time data and one or more lower order bit, and restoring the time-sequential arrangement of the received train of data according to the higher order bits of the adjusted count data while the lower order bit of the count data is used to maintain the synchronous communication between the transmitting machine and the receiving machine.

19. A machine readable media according to claim 18, wherein the step of restoring comprises successively separating from the train of data a time stamp which has the shorter length of the bits and indicates the time-sequential arrangement of the train of data, comparing each of the separated time stamps with the higher order bits of the adjusted count data to generate a coincidence signal every time the time stamp coincides with the count data, and responding to the coincidence signal to restore the time-sequential arrangement of the train of data.

20. A machine readable media according to claim 19, wherein the step of restoring further comprises detecting when the lower order bit of the count data is carried in order to provide a corresponding carry signal, and gating the coincidence signal in response to the carry signal to restore the time-sequential arrangement of the train of data.

21. A machine readable media according to claim 18, wherein the step of resetting comprises extracting the time data from the received train of data, registering a set of parallel bits including higher order bits allotted to the extracted time data and one or more lower order bit allotted to a default value, and rewriting the count data by the registered set of parallel bits to thereby adjust all bits of the count data in synchronization with the time data.

22. A machine readable media according to claim 18, wherein the transmitting machine transmits a train of digital audio data time-sequentially arranged to provide musical information, and the receiving machine restores the musical information as it is from the train of digital audio data by the synchronous communication with the transmitting machine.

* * * * *